United States Patent [19]

Kwon et al.

[11] Patent Number: 5,262,510

[45] Date of Patent: Nov. 16, 1993

[54] PROCESS FOR PREPARING POLYESTER RESINS CURED AT LOW TEMPERATURE AND POWDER COATING COMPOSITION THEREOF

[75] Inventors: O-Weon Kwon, Suwon; Bong-jin Kim, Seoul, both of Rep. of Korea

[73] Assignee: Korea Chemical Co., Ltd., Rep. of Korea

[21] Appl. No.: 626,140

[22] Filed: Dec. 12, 1990

[30] Foreign Application Priority Data

Dec. 28, 1989 [KR] Rep. of Korea .......................... 19843

[51] Int. Cl.$^5$ ................... C08G 59/06; C08G 63/123; C08G 63/127
[52] U.S. Cl. ................................ 528/112; 528/272; 528/296; 528/297; 528/300; 528/307; 528/308
[58] Field of Search ............... 528/272, 296, 297, 300, 528/307, 308

[56] References Cited

U.S. PATENT DOCUMENTS 4,731,422  3/1988  Tanabe et al. .................. 528/296
4,804,581  2/1989  Geary et al. .................... 525/113

*Primary Examiner*—Morton Foelak
*Assistant Examiner*—Jeffrey Culpeper Mullis
*Attorney, Agent, or Firm*—Lowe, Price, LeBlanc & Becker

[57] ABSTRACT

A process for preparing polyester resins comprises (1) reacting a mixture of organic carboxylic monomers having at least two reactive carboxyl groups with a mixture composed of at least two aliphatic alcohols having at least two hydroxyl groups to form a prepolymer, and (2) reacting the prepolymer with a mixture composed of pyromellitic dianhydride and adipic acid or azelaic acid to form polyester resins.

8 Claims, No Drawings

PROCESS FOR PREPARING POLYESTER RESINS CURED AT LOW TEMPERATURE AND POWDER COATING COMPOSITION THEREOF

FIELD OF THE INVENTION

The present invention relates to a process for preparing polyester resins which may be cured at a low temperature of about 160° C. in a short time of about 10 minutes.

The invention overcomes the disadvantages of conventional mixed powder coatings which require a high temperature (180° C.) cure in order to save energy and coating costs and to enhance a productivity.

DESCRIPTION OF THE PRIOR ART

The carboxylated polyesters useful for polyester-epoxy thermosetting powder coatings have carboxyl groups their terminal ends. Thus, the epoxy groups in epoxy resins are reacted with the carboxyl groups to form very stiff and graceful films as stated in the following reaction formula [1].

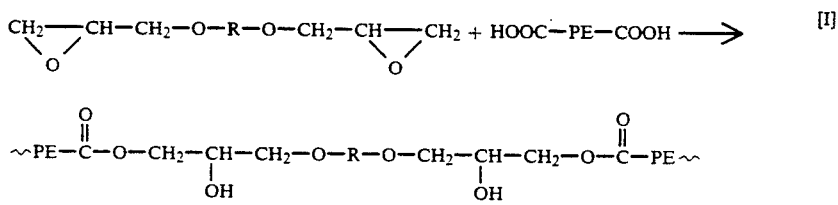

wherein PE is a main chain of the polyester resin.

In general, the resins used for powder coatings are amorphous and have, therefore, a high melting viscosity. Thus, when the resins are formed into coatings, the high melting viscosity thereof restricts the flow and degrades the appearance and smoothness of the films.

Therefore, a high curing temperature is required in order to overcome these aforementioned disadvantages (U.S. Pat. No. 4,094,721).

SUMMARY OF THE INVENTION

It is an object of the present invention to provide a process for preparing polyester resins which can be cured at low temperature and when coated, cannot have a bad effect on the appearance of coatings and other properties. It is an another object to provide a powder coating composition containing the above polyester resins. In order to achieve the object, the process of this invention comprises two steps of reactions as follows:

(1) reacting a mixture of organic carboxyl-containing monomers having more than two reactive carboxyl groups with a mixture composed of at least two aliphatic alcohols having at least two hydroxyl groups to form a prepolymer, and (2) reacting the prepolymer with a mixture composed of pyromellitic dianhydride and adipic acid or azelaic acid to form polyester resins. The powder coating composition of the invention comprises the polyester resins of this invention, diglycidyl ether bisphenol A epoxy resins, titanium dioxide and other additives. Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION

The kinds of functional groups, the concentrations of each component, a molecular weight, the kinds of monomer, a glass transition temperature and a resin crystallinity must be taken into consideration in order to prepare the resins of this invention.

The following equation presents the relation of curing reaction with cross-linking reaction in accordance with the effects of molecular weight and functional groups.

$$aGel = K/G\, Mw$$

wherein aGel is a curing temperature which can be regarded as an energy required for gelation, G is the multiplied value of the amounts of functional groups in the resins and the reactivity therof, Mw is a mean molecular weight, and K is a constant.

According to the equation above, it is important for one to select monomers such as acids or alcohols which have very highly reactive functional groups and a large molecular weight to cure the resins at relatively low temperature.

In particular, the carboxylated polyester resins using expoxy resins as curing agents must have very reactive carboxyl groups at the terminal ends which react with epoxy resins to form film coatings.

The effects of glass transition temperature(Tg) show flow to be better at lower Tg and cross linking to be more feasible at higher Tg during the film coating reactions (Periodic Journal of Japan Coating Industries, 1981, Vol. 49) with respect to the relation of Tg and the concentration of functional group. Tg is lower as the concentration of functional group increases. In other words, reactivity is good at lower Tg.

However, the powder coatings with a granular state should have a minimum storage stability. In general, a preferable Tg in the resins used for powder coatings is about 50° to 60° C.

The resins should have a crystallinity. Crystalline polymers have a lower melting viscosity than that of amorphous polymers having molecular weights similar to the polymers. Melting viscosity influences directly on the flow due to the molecular interaction. In order to form the good flow and leveling, the melting viscosity should be low or softening point adequate under the circumstance of no effects on storage stability. To prepare the resins having a lower melting viscosity, the resins themselves should form crystalline polymers. Moreover, to prepare crystalline polyester resins, it is important to select materials having a linear symmetric structure in the polymer.

In general, when the acids comprise terephthalic acid in an amount of more than 60 mole %, the speed of crystallinity is increased while a resistance against impact is decreased. When the acids comprise terephthalic acid in an amount of less than 40 mole %, the speed of crystallinity is extremely decreased.

When the alcohols comprise 1,4-butanediol in an amount of more than 70 mole %, the crystallinity is decreased. A melting peak temperature of about 100° to 150° C. is required by means of the differential thermal analysis of copolymer (JAPANESE KOKAI KOHO No. 62-45673).

In other word, the combination of linear symmetric materials must be properly controlled.

Furthermore, cross-linking agents (curing agents) and curing accelerators are deeply involved in preparing thermosetting powder coatings which may be cured at low temperature. In general, with regard to the curing agents used for polyester resin powder coatings, epoxy or triglycidyl isocyanurate (TGIC) curing agent is used for carboxyl polyester resins and isocyanate curing agent is used for hydroxyl polyester resins.

The present invention used epoxy curing agents for the carboxyl polyester resins. Amounts of use are about 20 to 60% by weight of total coating composition.

The epoxy curing agents include bisphenol A epoxy resins such as DER 661, 662, 662UH, 663U, 664U, 667, 668 and the like, novolac epoxy resins as mixtures of bisphenol A epoxy resins with bisphenol F epoxy resins such as DER 642U, 672U and the like. The DER used herein is a Trademark of DOW CHEMICAL Co., Ltd.

When one uses novolac epoxy resins which have a high molecular weight, it is possible to cure at low temperature for a short time because cross linkage is large. However, during the formation of film coating the curing reaction proceeds so fast that the coatings can not have enough time to flow sufficiently. Thus, the surface film coatings are not homogeneously formed and a blister and pinhole phenomena may be provided on the film surface occasionally. Therefore, a poor appearance occurs on the film surface and a gloss is degraded.

In general, when the polyesters used for powder coatings are coated, it is possible to cure at low temperature by means of using curing accelerators which are organic tin compounds such as di-butyl tin dilaurate, imidazole or derivatives of imidazole and tertiary amines such as tri-ethylene amine, and anhydride acid compounds.

The derivatives of imidazole are normally used for carboxyl polyesters for powder coatings among them. When the amounts of the accelerator are increased, it is possible to cure the resins at low temperature. However, when the amounts of the accelerators are too high, the appearance of film coatings is changed into yellow and the properties of the coatings are inclined to be degraded. The proper amounts of the accelerator are about 0.1 to 0.5 wt % of total coatings.

In general, the monomers used for preparing polyester resins include aliphatic or alicyclic alcohols having reactive groups of 2 to 3 and 2 to 6 carbons and aliphatic, alicyclic or aromatic carboxylic acids having 2 to 4 carboxyl groups and 4 to 12 carbons.

As a reference, the alcohols containing two reactive groups include ethylene glycol, diethylene glycol, triethylene glycol, propylene glycol, dipropylene glycol, 1,4-butylene glycol, 1,3-butylene glycol, 1,5-pentanediol, neopentyl glycol, 1,6-hexanediol, and 1,4-cyclohexanedimethanol, and the alcohols containing three reactive groups include trimethylol propane, and triethylol propane, glycerol, and alcohols containing four reactive groups include pentaerythritol and the like.

As examples of carboxylic acids having at least two reactive groups, azelaic acid, succinic acid, sebacic acid, 1,4-cyclohexanedicarboxylic acid, adipic acid, isophthalic acid, terephthalic acid, dimethyl terephthalic acid, trimellitic acid and trimellitic anhydride are included.

In particular, the present invention used pyromellitic dianhydride (P.M.D.A) in addition to the above compounds, which is highly reactive and has four groups in acidic compounds. Thus, the curing time of carboxyl group and epoxy group was reduced from 10 to 15 minutes at 180° C. to the same time at 160° C. As a reference, it can reduce 10% of energy consumption with a 10° C. decrease in curing temperature.

The process of this invention comprises reacting a mixture of organic carboxylic monomers having at least two reactive carboxyl groups with a mixture composed of at least two aliphatic alcohols having at least two hydroxyl groups to form a prepolymer having a hydroxyl value of 30 to 150 and reacting the prepolymer with a mixture composed of pyromellitic dianhydride and aliphatic acid to form carboxylic polyester resins having an acid value of 30 to 100 which can be cured at low temperature.

This invention will be described more in details as follow.

A process of this invention comprises (1) reacting an acid mixture having at least two reactive carboxyl groups including a linear aliphatic or an alicyclic organic carboxylic monomer in amounts of 5 to 20 wt %, a para-aromatic carboxylic acid in amounts of 60 to 80 wt % and ortho-or meta-aromatic carboxylic acid in an amount of less than 15 wt % with an alcohol mixture composed of at least two aliphatic alcohols having at least two hydroxyl groups, in an equivalent weight ratio of the acid mixture to the alcohol mixture of about 1.1 to about 1.5 to prepare a prepolymer having a hydroxyl value of 30 to 150, and (2) reacting the prepolymer with an acid mixture including pyromellitic dianhydride in amounts of 5 to 20 wt % based on the prepolymer and adipic acid or azelaic acid in amounts of 5 to 20 wt % based on the prepolymer to form polyester resins having an acid value of 30 to 100, a number-average molecular weight of 1,000 to 6,000 and at least four reactive carboxyl groups. The polyester resins according to the process of this invention can be cured at low temperature.

In order to prepare the polyester resins, it is very important to select a synthetic method for the resins and the kinds of monomers thereof.

The use of aromatic monomer of the prior art could cause the resulting polyester resins to improve in heat-resistance and in resistance against chemicals but to degrade the flow. Therefore the prior art had a problem that many winkles on the surface of coatings were provided due to the degrading of the flow. In order to resolve the problem, the inventors use the carboxylic acid mixture having a linear aliphatic or alicyclic organic monomer containing 4 to 12 carbon atoms to form polyester resins which can improved the flow and other physical properties of the coatings.

Also the polyester resins prepared by the above process of this invention have a softening point of 105° to 120° C. and a glass transition temperature of about 50° to 60° C. Therefore, the polymer resins can be cured at the low temperature.

In the above reactions, when the linear aliphatics or alicyclic acid monomers are used in an amount of less than 5 wt %, the flow and the appearance of film coatings are inclined to be poor while when these are used in an amount of more than 20 wt %, the flow is increased but the glass transition temperature or softening point is lowered so that the storage stability of coatings can be poor.

In the above reactions, when the para-aromatic carboxylic acid is used in an amount of less than 60 wt %, crystallinity and chemical resistance are degraded. It is thereby impossible to cure at the low temperature. On the other hand, when the para-aromatic carboxylic acid is used in an amount of more than 80 wt %, the crystallinity is increased but mechanical properties of film coatings are decreased.

The said ortho- or meta-carboxylic acids influence cross-linkage density directly. Therefore, when the ortho- or meta-carboxylic acids are used in an amount of more than 15 wt %, the mechanical properties are increased but cross-linkage density is so high that the appearance of film coatings and other properties may be degraded.

The above linear aliphatic or alicyclic acid monomer is preferably at least one monomer selected from group consisting of adipic acid, azelaic acid, succinic acid, sebacic acid and 1,4-cyclohexane dicarboxylic acid.

The above aromatic carboxylic acids are preferably composed of at least two monomers selected from the group consisting of terephthalic acid, dimethyl terephthalate acid, isophthalic acid, trimellitic anhydride and pyromellitic dianhydride. The carboxylic acids most preferably consist of adipic acid or cyclohexane dicarboxylic acid in amounts of 5 to 20 wt %, terephthalic acid in amounts of 60 to 80 wt % and isophthalic acid in an amount of less than 15 wt %.

The above alcohol mixture is preferably composed of at least two alcohols selected from groups consisting of aliphatic or alicyclic alcohols containing at least 2 hydroxyl groups and 2 to 6 carbon atoms and most preferably consists of neopentyl glycol in amounts of 70 to 90 wt % and at least one alcohol in amounts of 10 to 30 wt % selected from the group consisting of ethylene glycol, di-ethylene glycol, 1,4-butanediol, 1,6-hexanediol, 1,4-cyclohexanedimethanol and tri-methyol propane.

When the neopentyl glycol is used, the reactivity and other properties are good since it is a monomer having a neopentyl structure. However, when the neopentyl glycol is used in an amount of more than 90 wt %, the glass transition temperature may be too high. When the amount is less than 70 wt %, glass transition temperature and other properties are degraded.

When the alcohol mixture is used in an amount of less than 10 wt %, the flexibility is degraded. When the amount of the mixture is more than 30 wt %, the flexibility is so high that the storage stability will be lowered.

The said carboxyl groups react with epoxy curing agents. Therefore, it is possible to be cured at low temperature.

Furthermore, the coating composition followed by the procedure of the present invention comprises: 1) the carboxylic polyester resins in amounts of 20 to 40 wt % which have an acid value of 30 to 100, a number-average molecular weight of 1000 to 6000, and at least 4 reactive carboxyl groups in the polymers; b) diglycidyl ether bisphenol A epoxy resin in amounts of 20 to 60 wt % and equivalent weights of 700 to 1000; c) titanium dioxide in amounts of 20 to 60 wt %; and d) curing catalyst and additives in a small amount.

The reaction mechanism is presented as follows;

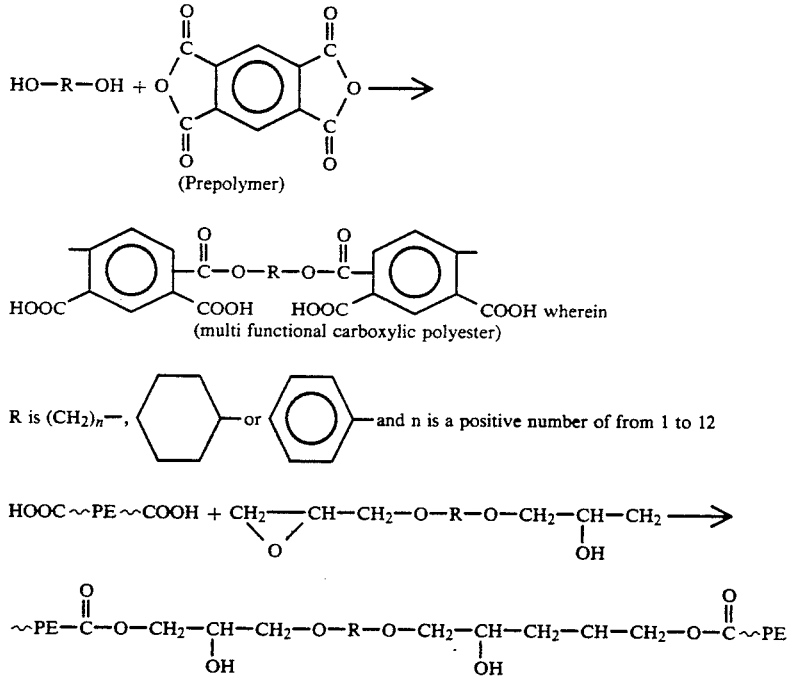

wherein PE represents the main chain of the polyester resins. The present invention comprises the following two steps;

1. First step of preparation of the prepolymer.

The alcohol mixtures were charged in the reactor wherein a stirrer, temperature indicator, nitrogen inlet nozzle and heat exchanger were installed. As nitrogen was charged in the reactor, the alcohol mixtures were heated and then melted at about 80° to 120° C. The acids was thereafter charged in the reactor. At the same time, esterification catalysts in amounts of 0.05 to 0.5 wt % were also introduced.

When the temperature was increased up to 170° to 180° C., condensated water started to form. When the reaction temperature was raised up to 240° to 250° C., the water was removed. The resulting products were transparent.

The transparent products were further reacted by injecting nitrogen, of which amounts were quantatively increased, to form the prepolymer having an acid value to be as low as 5, a hydroxyl value of 30 to 150, a melting viscosity of 5 to 30 poise at 150° C., and a number-average molecular weight of 400 to 2000, and the products were finally cooled down to 170° C.

2. Second step of preparation of the resins.

The prepolymer prepared by the first step of the reaction was reacted again with the acid mixture of adipic acid or azelaic acid in amounts of 5 to 20 wt % and pyromellitic dianhydride in amounts of 5 to 20 wt % based on the prepolymer and the reactants were reacted at about 200° C. When the reaction was maintained at that temperature until a number-average molecular weight and an acid value for the resulting product reached at 1000 to 6000 and 30 to 100, respectively. The final carboxylic polyester resins which may be cured at low temperature were obtained.

Preparation of powder coating composition

In order to prepare powder coating composition by using the carboxyl polyester reins in accordance with this invention, the composition comprised the resins in amounts of 20 to 40 wt %, and other additives such as flowing agent, antioxidants, ultraviolet absorbent and curing catalysts in a small amount. The above components were mixed in a reactor and were passed through an extruder. The resulting product was then crushed to form powder coatings.

The epoxy resins used as a curing agent are the copolymer prepared by the reaction of bisphenol A with epichlorohydrine. The epoxy resins have an equivalent weight of 700 to 1000 such as EPICOTE 1003, 1004 or 1005 in the series of diglycidyl ether bisphenol A (DGEBA). The amounts were determined by an acid value of polyester resins and an equivalent weight ratio of epoxy to carboxyl polyester resins. The equivalent weight ratio is preferably 1.0~1.1 to 1. Also, 2-phenylimidazole (VEBA B-31) was used as curing accelerator and MODAFLOW I (Product of Monsanto) or Acronal 4F (Product of BASF) could be used as an flow accelerator and Iraganox-1076 (Profuct of Ciba Geigy) was used as a stabilizer.

The invention will be understood more readily be reference to the following examples; however, these examples are intended to illustrate the invention and are not to be construed to limit the scope of the invention.

EXAMPLE 1

The components of Nos. 1 to 6 in TABLE A were reacted by using a gradual heating up to 250° C. and then the resulting reactants were cooled down to 240° C. The reaction was continued until the condensate water did not appear any longer to form a prepolymer.

In order to eliminate the unreacted components and the condensate water in the prepolymer and to enhance copolymerization, nitrogen was injected sufficiently or a pressure was reduced down to 30 to 50 mmHg in the reactor. The prepolymer prepared by said procedure had a hydroxyl value of 53 and an acid value of 2.

The said prepolymer was cooled down to 160° C. and reacted with No. 7 and No. 8 in TABLE A. The reactants were then reacted by using a gradual heating up to 200° C. The reaction was continued until the molecular weight and the acid value were at a predetermined level, respectively. The carboxylic polyester resins were formed.

We presented the components which are necessary to prepare powder coatings by using the said resins in TABLE B.

The components described in Table B were charged to a HENXEL mixer made by ALPINE CO. and homogeneously mixed. The mixtures in the mixer were charged again to an extruder (BUSS KNEADER PLK46) and mixed and melted at 90° to 120° C. The resulting mixture was cooled and crushed with 100 microns particle size. The powder coatings were then cured at 160° C. for 10 minutes and 180° C. for 10 minutes to have a film coating thickness of 60 microns after coating them with a static spray gun.

TABLE A

| No | COMPONENTS | WEIGHT PARTS |
|---|---|---|
| 1 | Terephthalic acid | 697.2 |
| 2 | Adipic acid | 51.1 |
| 3 | Neopentyl glycol | 423.3 |
| 4 | Ethylene glycol | 63 |
| 5 | 1,6-hexanediol | 60 |
| 6 | FASCAT 4101[1] | 1.33 |
| 7 | Pyromellitic dianhydride | 76.8 |
| 8 | Adipic Acid | 51.7 |

TABLE B

| No | COMPONENTS | WEIGHT |
|---|---|---|
| 1 | The carboxylic polyester resin | 100 |
| 2 | Epoxy Resins[2] (Epicote 1003) | 80 |
| 3 | Acronal 4F[3] (BASF Co.) | 0.5 |
| 4 | Titanium Dioxide | 90 |
| 5 | Iraganox 1076[4] (Ciba Geigy) | 0.3 |
| 6 | Tinubin 900[5] (Ciba Geigy) | 0.3 |
| 7 | Benzoin | 0.3 |
| 8 | B-31[6] (Shigokyukasei) | 0.45 |

COMPARATIVE EXAMPLE 1

In order to compare with the resin of EXAMPLE 1, the prepolymer was prepared in the same manner as in example 1 above except only trimellitic anhydride was used to prepare the resin.

The same manner as in EXAMPLE 1 was used to prepare the resin with the components described in the following TABLE C. The final resin had an acid value of 52 and a melting viscosity of 19 poise at 200° C. In addition, by using the same manner and components as in Example 1 above, the coating was prepared.

The physical properties of film coatings prepared by the methods of Example 1 and Comparative Example 1 were analyzed and described in TABLES 1 and 2.

TABLE C

| No | COMPONENTS | WEIGHT PARTS |
|---|---|---|
| 1 | Terephthalic acid | 697.2 |
| 2 | Adipic acid | 51.1 |
| 3 | Neopentyl glycol | 423.3 |
| 4 | Ethylene glycol | 63 |
| 5 | 1,6-hexanediol | 60 |
| 6 | Fascat 4101 | 1.33 |

TABLE C-continued

| No | COMPONENTS | WEIGHT PARTS |
|---|---|---|
| 7 | Trimellitic anhydride | 136.5 |

TABLE 1

| NO. TEST | EXAMPLE 1 | COMPARATIVE EXAMPLE 1 | EXAMPLE 1 | COMPARATIVE EXAMPLE 1 |
|---|---|---|---|---|
| Curing Condition | 10 minutes at 160° C. | | 10 minutes at 180° C. | |
| Pencil Hardness | H | F> | H | H |
| Impact Resistance (1 kg/50 cm, ⅛ inch φ) | good | crack | good | good |
| Erichsen | 8 mm | 5 mm | 8 mm | 8 mm |
| Gloss (60°) | 97 | 85 | 99 | 96 |
| Bending Resistance | good | bad | good | good |

TABLE 2

| NO. TEST | EXAMPLE 1 | COMPARATIVE EXAMPLE 1 | EXAMPLE 1 | COMPARATIVE EXAMPLE 1 |
|---|---|---|---|---|
| Curing Condition | 10 minutes at 160° C. | | 10 minutes at 180° C. | |
| Heat Resistance (200° C., 1 hr.) | 1.7 | 2.5 | 1.5 | 2.2 |
| Solvent Resistance (Xylene, 24 hrs.) | good | bad | good | good |
| Acid Resistance 5% H₂SO₄, 500 hrs.) | good | bad | good | good |
| Alkaline Resistance (5%. NaOH, 500 hrs.) | good | bad | better | good |
| Resistance against boiling water (100° C., 2 hrs.) | good | Acceptable | better | good |
| salt Resistance (5% Nacl, 100 hrs.) | good | bad | good | good |
| Resistance against weather (after 500 hrs) | good | bad | better | good |
| Storage Stability (40° C., 1 week) | good | good | good | good |
| Adhesion | good | bad | good | good |

From the above TABLE 1, EXAMPLE 1 showed better physical properties compared with COMPARATIVE EXAMPLE 1 in the same curing condition of 10 minutes at 160° C. and the physical properties in COMPARATIVE EXAMPLE 1 showed better results only at the curing condition of 10 minutes at 180° C.

EXAMPLE 2

In Example 2, 1,6-hexanediol of EXAMPLE 1 was replaced with 1,4-cyclohexanedimethanol. Components used in EXAMPLE 2 were described in the following TABLE D. The resins were prepared in the same manner as Example 1.

The resulting resins had an acid value of 52 and a melting viscosity of 15 poise at 200° C. The resin was used to form powder coatings in the same manner as in EXAMPLE 1. The curing reaction was performed at 160° C. for 10 minutes and desirable physical properties as described below were obtained.

Pencil Hardness: >H
Impact Resistance: >1 Kg/40 cm
Erichsen: 8 mm
Gloss: >90
Bending Resistance: good

TABLE D

| No | COMPONENTS | WEIGHT PARTS |
|---|---|---|
| 1) | Terephthalic acid | 796.8 |
| 2) | Adipic acid | 58.4 |
| 3) | Neopentyl glycol | 483.8 |
| 4) | Ethylene glycol | 72 |
| 5) | 1,4-cyclohexanedimethanol | 83.8 |
| 6) | Fascat 4101 | 1.5 |
| 7) | Pyromellitic dianhydride | 89.7 |
| 8) | Adipic acid | 60.3 |

EXAMPLE 3

In the first step of the reaction, the prepolymer was prepared by the same method as in EXAMPLE 1. Components used in Example 3 were described in the following TABLE E. In the second step of the reaction, the resin which had an acid value of 50 and a melting viscosity of 14 poise at 200° C. was prepared by the reaction of the acid mixture cosisting of 69.6 weight parts pyromellitic dianhydride and 93.6 weight parts adipic acid. The resin was used to prepare powder coatings in the same manner as EXAMPLE 1. The powder coatings were cured at 160° C. for 10 minutes. The resulting film coating had desirable physical properties as described below.

Pencil Hardness: >H
Impact Resistance: >1 Kg/50 cm
Erichsen: 8 mm
Gloss: 95
Bending Resistance: good
Adhesion: good

TABLE E

| No | COMPONENTS | WEIGHT PARTS |
|---|---|---|
| 1) | Terephthalic acid | 831 |
| 2) | Adipic acid | 73.1 |
| 3) | Neopentyl glycol | 525.9 |
| 4) | Ethylene glycol | 80.2 |
| 5) | Trimethylol propane | 23.4 |
| 6) | Fascat 4101 | 1.6 |
| 7) | Pyromellitic dianhydride | 69.6 |
| 8) | Adipic acid | 93.6 |

EXAMPLE 4

In the first step of the reaction, the prepolymer was prepared by the same method as in EXAMPLE 1. Components used in Example 4 were described in the following TABLE F. In the second step of the reaction, the resin which had an acid value of 62 and a melting viscosity of 16 poise at 200° C. was prepared by the reaction of the acid mixture consisting of 96.7 weight parts pyromellitic dianhydride and 86.7 weight parts adipic acid. The resin was used to form powder coatings in the same manner as in Example 1 except using the components in the following TABLE G.

The powder coatings were cured at 160° C. for 10 minutes. The resulting film coating had the desirable physical properties as described below.

Pencil Hardness: >H
Impact Resistance: >1 Kg/50 cm
Erichsen: 8 mm
Gloss: >95
Bending Resistance: good
Adhesion: better

TABLE F

| No | COMPONENTS | WEIGHTS |
|---|---|---|
| 1) | Terephthalic acid | 581.7 |
| 2) | Isophthalic acid | 249.3 |
| 3) | 1,4-cyclohexane dicarboxylic acid | 86 |
| 4) | Neopentyl glycol | 525.9 |
| 5) | Diethylene glycol | 137.4 |
| 6) | Trimethylol propane | 23.5 |
| 7) | Fascat 4101 | 1.6 |

TABLE G

| No | COMPONENTS | WEIGHTS |
|---|---|---|
| 1) | The carboxyl polyester resin | 100 |
| 2) | Epoxy resins (epicote 1003) | 100 |
| 3) | Acoronal 4F (BASF Co.) | 0.55 |
| 4) | Titanium dioxide | 100 |
| 5) | Iraganox 1076 (Ciba Geigy Co.) | 0.33 |
| 6) | Tinubin 900 (Ciba Geigy Co.) | 0.33 |
| 7) | Benzoin | 1.0 |
| 8) | B-31 (Shigohyukasei Co.) | 0.45 |

EXAMPLE 5

The components described in the following Table H were reacted to prepare a polyester resin in the same manner as in Example 1 above. The resulting resin had an acid value of 62 and a melting viscosity of 16 poise at 200° C. The resin was used to prepare powder coatings in the same manner as in EXAMPLE 4. The powder coating was then cured at 160° C. for 10 minutes. Physical properties thereof were described as follow;

Pencil Hardness: >H
Impact Resistance: >1 Kg/50 cm
Erichsen: 8 mm
Gloss: >90
Bending Resistance: good
Adhesion: better

TABLE H

| No | COMPONENTS | WEIGHTS |
|---|---|---|
| 1) | Terephthalic acid | 581.7 |
| 2) | Isophthalic acid | 249.3 |
| 3) | 1,4-cyclohexane dicarboxylic acid | 86 |
| 4) | Neopentyl glycol | 448 |
| 5) | Diethylene glycol | 127.4 |
| 6) | 1,4-butanediol | 99 |
| 7) | Fascat 4101 | 1.6 |
| 8) | Pyromellitic dianhydride | 111.9 |
| 9) | Adipic Acid | 65.4 |

The powder coatings prepared according to the examples of the present invention is found to have a superior gloss and appearance on the film coatings and have good mechanical characteristics especially with respect to solvent resistance, heat-resistance, resistance against boiling water, and chemical resistance. In addition, the above effects of the present invention are achieved even though the curing reaction proceeds at the low temperature.

Obviously many modifications and variations of the present invention are possible in the light of the above teachings. It is therefore to be understood that within the scope of the appended claims, the invention may be practiced otherwise than as specifically described.

We claim:

1. A powder coating composition comprising:
   (a) a carboxylic polyester resin which can be cured at low temperature in an amount of 20 to 40 wt %, the carboxylic polyester resin being prepared by
   (i) reacting a first acid mixture with an alcohol mixture to form a prepolymer having a hydroxyl value of 30 to 150, said first acid mixture containing acids having at least two reactive carboxyl groups and including a linear aliphatic organic carboxylic acid or an alicyclic organic carboxylic acid in an amount of 5 to 20 weight percent, a para-aromatic carboxylic acid in an amount of 60 to 80 weight percent and an ortho- or meta-aromatic carboxylic acid in an amount of less than 15 weight percent, said alcohol mixture comprising at least two aliphatic alcohols, each of said alcohols having at least two hydroxyl groups, said first acid mixture and said alcohol mixture being reacted in an acid mixture to alcohol mixture equivalent ratio of about 1.1 to about 1.5; and
   (ii) reacting said prepolymer with a second acid mixture to form a polyester resin having an acid value of 30 to 100, a number average molecular weight of 1000 to 6000 and at least four reactive carboxylic groups, the second acid mixture consisting essentially of pyromellitic dianhydride in an amount of 5 to 20 weight percent based on the prepolymer, and adipic acid or azelaic acid in an amount of 5 to 20 weight percent based on the prepolymer;
   (b) diglycidyl ether bisphenol A epoxy resin having an equivalent weight of 700 to 1000 in an amount of 20 to 60 wt %,
   (c) titanium dioxide in an amount of 20 to 60 wt %, and
   (d) a curing catalyst.

2. The powder coating composition as defined by claim 1, wherein the linear aliphatic or alicyclic organic carboxylic acid has at least two reactive carboxyl groups and 4 to 12 carbon atoms.

3. The powder coating composition as defined by claim 1, wherein the linear aliphatic or alicyclic organic carboxylic acid is selected from the group consisting of adipic acid, azelaic acid, succinic acid, sebacic acid and 1,4-cyclohexane dicarboxylic acid.

4. The powder coating composition as defined by claim 1, wherein the aromatic carboxylic acids comprise at least two acids selected from the group consisting of terephthalic acid, dimethyl terephthalate, isophthalic acid, trimellitic anhydride and pyromellitic dianhydride.

5. The powder coating composition as defined by claim 1, wherein the alcohol mixture comprises at least two alcohols selected from the group consisting of aliphatic and alicyclic alcohols containing at least two hydroxyl groups and 2 to 6 carbon atoms.

6. The powder coating composition as defined by claim 1, wherein the alcohol mixture comprises neopentyl glycol in an amount of 70 to 90 wt % and at least one alcohol in an amount of 10 to 30 wt % selected from the group consisting of ethylene glycol, diethylene glycol, 1,4-butanediol, 1,6-hexanediol, 1,4-cyclohexanedimethanol and trimethylol propane.

7. The powder coating composition as defined by claim 1, wherein the first acid mixture comprises adipic acid or 1,4-cyclohexane dicarboxylic acid in an amount of 5 to 20 wt %, terephthalic acid in an amount of 60 to 80 wt % and isophthalic acid in an amount of less than 15 wt %.

8. A powder coating composition as defined by claim 1, further comprising at least one additive selected from flow agents, antioxidants, and ultraviolet absorbents.

* * * * *